Sept. 29, 1959  J. H. PAYTON ET AL  2,906,627
METHOD OF HEAT SHRINKING WRAPPERS ON FOOD
Filed Aug. 3, 1956  3 Sheets-Sheet 1

INVENTORS:
JOHN H. PAYTON
HILMAR U. SCHUETZE
BY
Milo B. Stevens & Co.
ATTORNEYS.

INVENTORS:
JOHN H. PAYTON
HILMAR U. SCHUETZE
BY
ATTORNEYS.

Sept. 29, 1959   J. H. PAYTON ET AL   2,906,627
METHOD OF HEAT SHRINKING WRAPPERS ON FOOD
Filed Aug. 3, 1956   3 Sheets-Sheet 3

INVENTORS:
JOHN H. PAYTON
HILMAR U. SCHUETZE
BY
Milo B. Stevens & Co.
ATTORNEYS.

United States Patent Office 2,906,627
Patented Sept. 29, 1959

2,906,627

METHOD OF HEAT SHRINKING WRAPPERS ON FOOD

John H. Payton and Hilmar O. Schuetze, Chicago, Ill., assignors to Great Lakes Stamp & Mfg. Co., Inc., Chicago, Ill.

Application August 3, 1956, Serial No. 601,957

1 Claim. (Cl. 99—171)

Our invention relates to machines for shrinking wrappers on food packages and the like, and one object of the present invention is a method to shrink wrappers on food packages and to conserve the heat applied to the wrappers in order to obtain a desired quality of wrapped food package on an efficient and economical scale.

A further object is to employ a method of forcing hot air to shrink a package wrapper and for returning warm air to its source for reuse after such air has completed its function in respect to a wrapped package.

An additional object is to construct the improved apparatus in a manner to circulate the warm air directed to the package in a manner to return such air to the source which creates it, so that a considerable saving in the operation of the heating unit for the air is effected.

An important object is to build the improved apparatus along lines of compactness and easy portability.

With the above objects in view, a better understanding of the invention may be had by reference to the accompanying drawings, in which—

Figure 1:
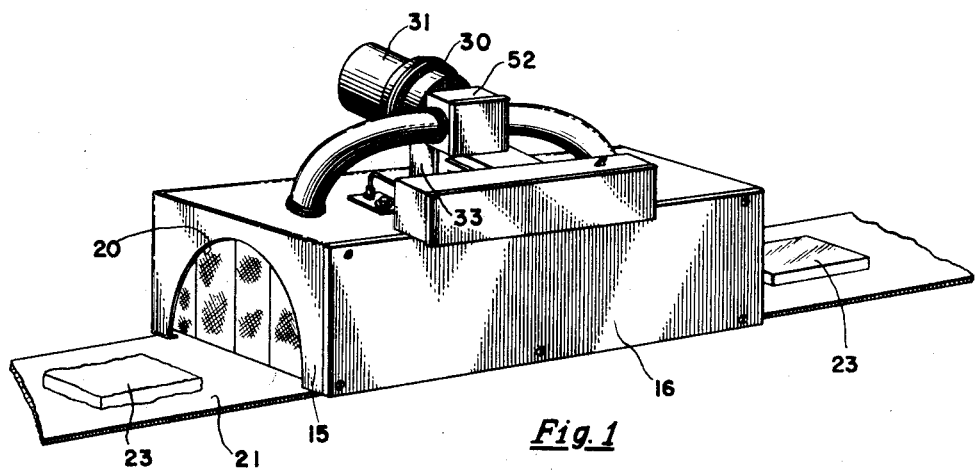
Fig. 1 is a perspective view of the apparatus as applied to a conveyor carrying packaged foods.

In accordance with the foregoing, specific reference to the drawing indicates the housing of the apparatus at 15, such housing being rectangular in form and elongated as shown in Fig. 1. The housing is insulated on the outside, as indicated at 16, for the retention of heat.

The housing 15 is open at the bottom and has arched end openings 20 in order to be adapted for the passage of a conveyor belt 21 on the underside. As shown in Fig. 1, the packaged foods 23 are carried by the conveyor belt 21 and designed to pass through the housing 15.

As shown in one form of the invention, the housing 15 contains an arched chamber 25 which is made with openings 26 on the inner side. Thus, warm air fed to the chamber 25 forcibly issues from the openings 26 to contact all exposed sides of the package 23 as it rides on the conveyor belt 21 and procure the shrinking of the package wrapper.

Figures 4, 5:
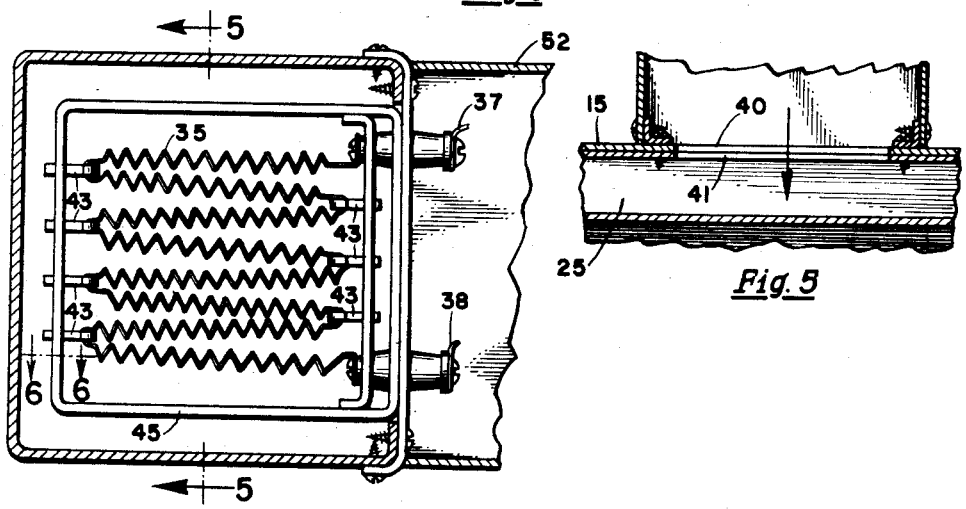
Fig. 4 is an enlarged section on the line 4—4 of Fig. 2.
Fig. 5 is a section on the line 5—5 of Fig. 4, but on a smaller scale.
Figure 6:
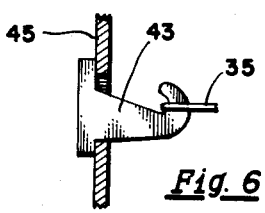
Fig. 6 is a detail of a hook on the section line 6—6 of Fig. 4.

The source of the warm air for the chamber 25 is a blower 30 operated by an electric motor 31. The blower creates a down-draft of air which passes through a compartment 33 before entering the chamber 25. As shown in Fig. 4, the compartment 33 contains a group of heating coils 35 leading in series from feed wires 37 and 38, Fig. 5 shows that the bottom of the compartment 33 has an opening 40 registering with a top opening 41 in the chamber 25, whereby to lead the air warmed by the coils 35 into such chamber. Fig. 6 shows that hooks 43 of refractory material are employed endwise of the coils 35 for the support thereof from inner walls 45 of the compartment 33.

It is understood that a considerable amount of heat would develop in the housing 15 when the apparatus is in continued use; and such heat was merely allowed to become dissipated into the atmosphere in the case of the apparatus treated in our said application. However, in the present instance, a considerable amount of this heat is reclaimed, so that the routine use of the heating unit may require a lesser amount of current. For the purpose just stated, a pair of large conduits 50 is led from the end portions of the housing 15 in upward and converging directions to join in a casing 52 which is directly coupled to the blower 30. Thus, with the latter creating the down-draft mentioned, suction will occur in the conduits 50, so that excess or cooler portions of the air in the housing 15 will be drawn up into the blower and projected through the heating coils 35 to be warmed over and communicated to the chamber 25.

Figure 7:
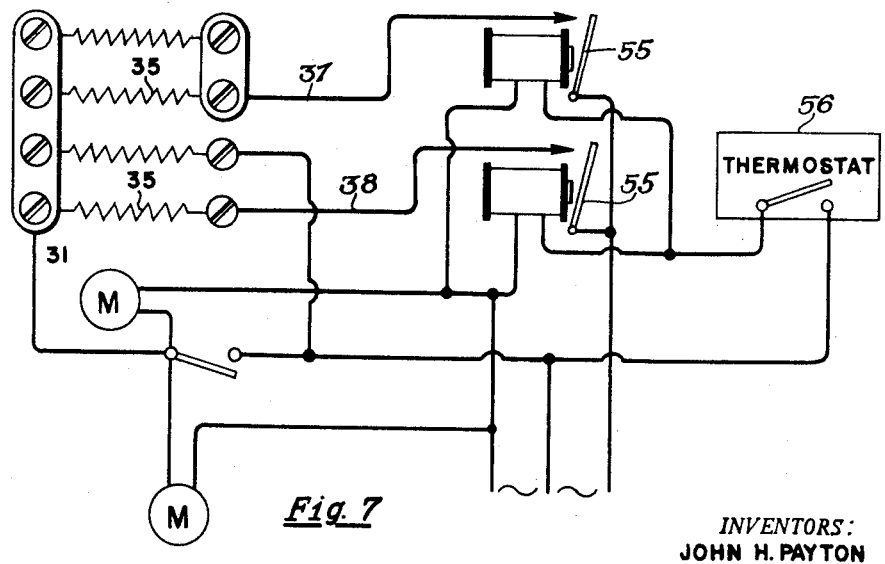
Fig. 7 is a diagrammatic view of an electrical circuit employed in the apparatus.
Figure 2:
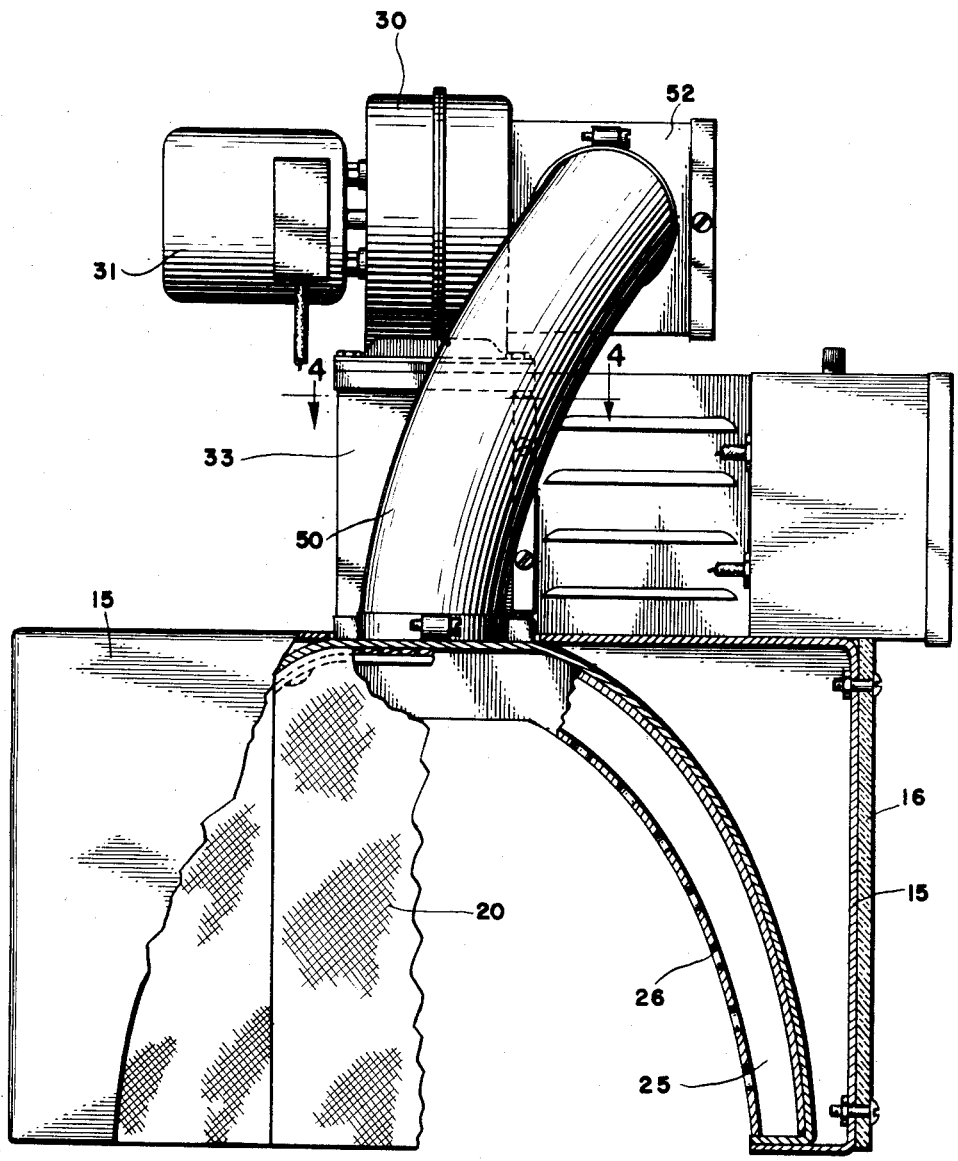
Fig. 2 is a view from the left-hand portion of Fig. 1, on an enlarged scale and partly in section.
Figure 3:
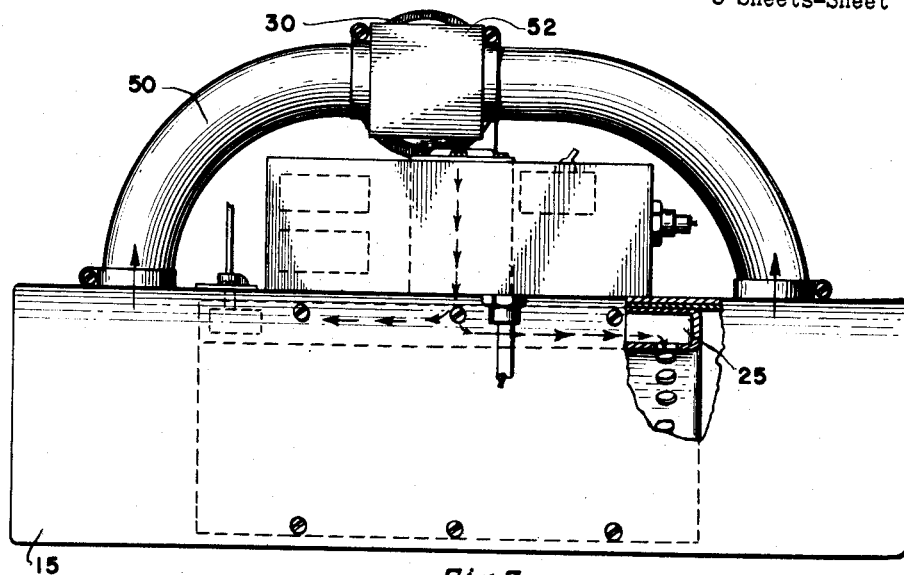
Fig. 3 is an enlarged elevation of the apparatus as seen in Fig. 1 and partly in section.

The diagram shown in Fig. 7 is typical of a three-wire single phase circuit suitable for the apparatus and employing relays 55 and a thermostat 56. Any other circuit may of course be designed for the apparatus which will give good results.

It will now be apparent that the improved apparatus is an important advance in the efficiency of the package treatment. In other words, instead of allowing the warm air to become cooled and dissipated into the atmosphere, it is drawn back into the blower after the air has had the desired effect on the package, rewarmed, and returned into the package environment for reuse. A lesser amount of current will therefore be required for operating the coils 35 at a rate consistent with the improved treatment.

While we have described the invention along specific lines, various minor changes or refinements may be made therein without departing from its principle, and we reserve the right to employ all such changes and refinements as may come within the scope and spirit of the appended claim.

We claim:

The method of packaging food comprising encasing a food product in a heat shrinkable wrapper, progressively conveying said food package through a limited heating zone in an enclosure, forcibly directing a stream of hot air at all exposed sides of said food package to shrink the wrapper thereon at all exposed sides, and salvaging relatively hot air outside the opposite ends of said heating zone but still in said enclosure to maintain a substantially constant temperature in said heating zone and recirculating the salvaged air to said heating zone for subsequent impingement on subsequently conveyed food packages.

References Cited in the file of this patent

UNITED STATES PATENTS

| | | |
|---|---|---|
| 1,285,615 | Canepa et al. | Nov. 26, 1918 |
| 1,559,076 | Collins | Oct. 27, 1925 |
| 1,950,006 | Lydon | Mar. 6, 1934 |
| 2,161,211 | Werner | June 6, 1939 |
| 2,376,583 | De Poix | May 22, 1945 |
| 2,385,257 | Cavallito | Sept. 18, 1945 |
| 2,385,962 | Barnett | Oct. 2, 1945 |
| 2,663,951 | Kennison | Dec. 29, 1953 |
| 2,668,403 | Rumsey | Feb. 9, 1954 |
| 2,783,599 | Weikert | Mar. 5, 1957 |